(12) United States Patent
Bourlet

(10) Patent No.: US 9,635,850 B2
(45) Date of Patent: May 2, 2017

(54) FLOATING PNEUMATIC STABILIZED ROTATION DEVICE

(71) Applicant: Brett Bourlet, LaPlace, LA (US)

(72) Inventor: Brett Bourlet, LaPlace, LA (US)

( * ) Notice: Subject to any disclaimer, the term of this patent is extended or adjusted under 35 U.S.C. 154(b) by 161 days.

(21) Appl. No.: 14/555,217

(22) Filed: Nov. 26, 2014

(65) Prior Publication Data

US 2016/0143265 A1 May 26, 2016

(51) Int. Cl.
*A01M 31/06* (2006.01)

(52) U.S. Cl.
CPC .................................. *A01M 31/06* (2013.01)

(58) Field of Classification Search
CPC ....................................................... A01M 31/06
USPC ............................................................. 43/3, 2
See application file for complete search history.

(56) References Cited

U.S. PATENT DOCUMENTS

| | | | | |
|---|---|---|---|---|
| 230,600 A * | 8/1880 | Allen | ..................... | A01M 31/06 43/3 |
| 470,564 A * | 3/1892 | Henderson | ............ | A01M 31/06 43/3 |
| 836,823 A * | 11/1906 | Oliver | ................... | A01M 31/06 43/3 |
| 883,161 A * | 3/1908 | Rosentreter | ........... | A01M 31/06 43/3 |
| 1,290,359 A * | 1/1919 | Reid | ....................... | A01M 31/06 43/3 |
| 1,292,618 A * | 1/1919 | Lazelle | .................. | A63H 23/10 43/42.22 |
| 1,299,896 A * | 4/1919 | Anderson | ............. | A01M 31/06 43/3 |
| 1,392,065 A * | 9/1921 | Klock | ................... | A01M 31/06 43/3 |
| 1,468,979 A * | 9/1923 | Sherman | ............... | A01M 31/06 43/3 |
| 1,859,268 A * | 5/1932 | Larson | ..................... | A63H 5/00 43/3 |
| 1,918,874 A * | 7/1933 | Shannahan | ............ | A63H 23/10 43/3 |
| 2,101,646 A * | 12/1937 | Gordon, Jr. | ............ | A63H 23/06 446/163 |

(Continued)

OTHER PUBLICATIONS

The Mallard Machine 3-Duck Motion Decoy System product from http://www.basspro.com/The-Mallard-Machine-3Duck-Motion-Decoy-System/product/96607/#desc-tab.

(Continued)

*Primary Examiner* — Darren W Ark

(74) *Attorney, Agent, or Firm* — John B. Edel; Edel Patents LLC

(57) ABSTRACT

Floating devices which may contain a floating body, a stabilizer pivotally attached to the floating body at a pivot axis, a protruding portion of the floating body extending away from the pivot axis, a buoyancy cavity, and an air pump are disclosed herein. Such floating devices may undergo stabilized pneumatic pitching and have features such as a stabilizer that rotates freely with respect to the floating body along the pivot axis, a buoyancy cavity that is in fluid communication with the air pump, and buoyancy cavity that has an alternating displacement volume that is sufficient to cause the floating body to rotate greater than 35 degrees with respect to the stabilizer upon application of a continuous supply of air from the air pump.

13 Claims, 4 Drawing Sheets

(56) References Cited

U.S. PATENT DOCUMENTS

| | | | | |
|---|---|---|---|---|
| 2,162,786 A * | 6/1939 | Oeding | A01M 31/06 | 43/3 |
| 2,185,013 A * | 12/1939 | Bonetti | A01M 31/06 | 43/3 |
| 2,224,650 A * | 12/1940 | Holloway | A63H 23/02 | 446/161 |
| 2,227,242 A * | 12/1940 | Boutin | A01M 31/06 | 43/3 |
| 2,237,194 A * | 4/1941 | Ohnmacht | A01M 31/06 | 43/3 |
| 2,434,335 A * | 1/1948 | Signalness | A01M 31/06 | 43/3 |
| 2,457,295 A * | 12/1948 | Woodhead | A01M 31/06 | 43/3 |
| 2,536,736 A * | 1/1951 | Gazalski | A01M 31/06 | 43/3 |
| 2,546,189 A * | 3/1951 | Keep | A01M 31/06 | 43/3 |
| 2,591,554 A * | 4/1952 | Kinney | A01M 31/06 | 43/3 |
| 2,608,361 A * | 8/1952 | Huebner | A01M 31/06 | 43/3 |
| 2,674,065 A * | 4/1954 | Sprinkle | A63H 23/06 | 446/154 |
| 2,793,456 A * | 5/1957 | Argo | A01M 31/06 | 43/3 |
| 2,814,898 A * | 12/1957 | Fluke | A01M 31/06 | 43/3 |
| 2,909,859 A * | 10/1959 | Christmas | A01M 31/06 | 43/3 |
| 3,034,245 A * | 5/1962 | Lynch | A01M 31/06 | 43/3 |
| 3,059,368 A * | 10/1962 | Wortman | A01M 31/06 | 43/3 |
| 3,434,234 A * | 3/1969 | Schleter | A63H 23/10 | 446/158 |
| 3,896,578 A * | 7/1975 | Franceschini | A01M 31/06 | 43/3 |
| 5,566,491 A * | 10/1996 | Phillips | A01M 31/06 | 43/3 |
| 6,079,140 A * | 6/2000 | Brock, IV | A01M 31/06 | 43/3 |
| 6,088,944 A * | 7/2000 | Jones | A01M 31/06 | 43/3 |
| 6,412,209 B1 * | 7/2002 | Kapraly | A01M 31/06 | 43/3 |
| 6,412,210 B1 * | 7/2002 | Horrell | A01M 31/06 | 43/3 |
| 6,643,971 B2 * | 11/2003 | Daniels | A01M 31/06 | 43/3 |
| 6,655,070 B2 * | 12/2003 | Wood | A01M 31/06 | 43/2 |
| 6,845,586 B1 * | 1/2005 | Brock, IV | A01M 31/06 | 43/2 |
| 6,957,509 B2 * | 10/2005 | Wright | A01M 31/06 | 43/3 |
| 7,322,144 B2 * | 1/2008 | Brewer | A01M 31/06 | 43/3 |
| 7,475,509 B2 * | 1/2009 | Cagle | A01M 31/06 | 43/3 |
| 7,562,487 B2 * | 7/2009 | Barr | A01M 31/06 | 43/2 |
| 8,919,028 B2 * | 12/2014 | Young | A01M 31/06 | 43/3 |
| 8,931,202 B1 * | 1/2015 | Niels | A01M 31/06 | 43/3 |
| 8,950,103 B2 * | 2/2015 | Bullerdick | A01M 31/06 | 43/2 |
| 9,253,974 B2 * | 2/2016 | Baskfield | A01M 31/06 | |
| 2004/0010957 A1 * | 1/2004 | Corbiere, Jr. | A01M 31/06 | 43/3 |
| 2005/0022440 A1 * | 2/2005 | Pinkston | A01M 31/06 | 43/3 |
| 2009/0077856 A1 * | 3/2009 | Cagle | A01M 31/06 | 43/3 |
| 2009/0151217 A1 * | 6/2009 | Gregory | A01M 31/06 | 43/3 |
| 2011/0146132 A1 | 6/2011 | Young | | |

OTHER PUBLICATIONS

Ducks Unlimited article at: http://www.ducks.org/hunting/decoys/bring-your-rig-to-life.

* cited by examiner

FLOATING PNEUMATIC STABILIZED ROTATION DEVICE

Floating pneumatic stabilized rotation devices described herein may be used in hunting, as amusement devices, and for other purposes. Certain floating pneumatic stabilized rotation devices disclosed herein are able to create stable pitching motions with limited roll. Certain floating pneumatic stabilized rotation devices disclosed herein may further be useful as motion duck decoys simulating a duck feeding.

DETAILED DESCRIPTION

Example 1

Figure 1:
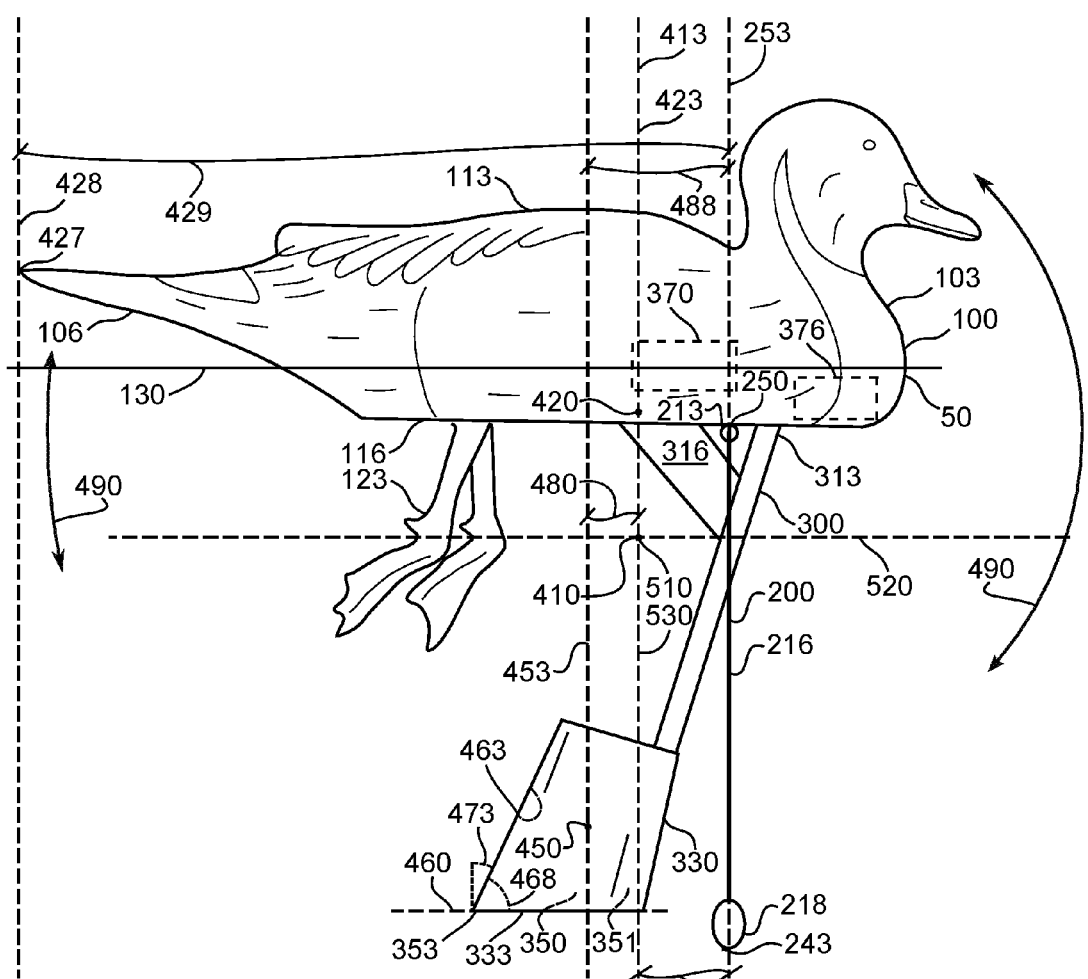
FIG. 1 shows a side view of a duck decoy embodiment in the normal position.

Referring now to FIG. 1 of the drawings, Duck decoy body 100 has a Dipping end 103, a Rising end 106, a Normal position top 113, and a Normal position bottom 116. Due to the dynamic nature of Stabilized rotation device 50 as it operates in water, various components are described with respect to a normal position. The normal position represents the orientation and location of Stabilized rotation device 50 relative to Water line 130 when Stabilized rotation device 50 is floating in a still water with Alternating displacement volume 351 completely filled with water. Buoyancy cavity 350 represents the internal volume of Buoyancy vessel 330. Alternating displacement volume 351 is the portion of the volume within Buoyancy cavity 350 that is capable of alternatingly holding air and water during the normal oscillating operation of Stabilized rotation device 50. In the normal position, Normal position bottom 116 is below Water line 130. Duck decoy body 100 further has Decoy feet and legs 123. Duck decoy body 100 is part of Stabilized rotation device 50 which also contains a Stabilizing system 200 and a Pneumatic rotation system 300. Stabilizing system 200 contains Stabilizer tube 213, Stabilizer wire 216, and Stabilizer weights 218. Stabilizer tube 213 is attached to Normal position bottom 116 and Stabilizer wire 216 runs through the middle of Stabilizer tube 213. Stabilizer wire 216 is bent at each end of Stabilizer tube 213 such that Stabilizer wire 216 extends vertically downward from the ends of Stabilizer tube 213. Stabilizer wire 216 fits loosely within Stabilizer tube 213. At each end of Stabilizer wire 216 there is a Stabilizer weight 218 and Wire tips 243 are bent such that Stabilizer weights 218 do not fall off the ends of Stabilizer wire 216. Pivot axis 250 is the axis along which Duck decoy body 100 pivots with respect to Stabilizer wire 216 and Pivot plane 253 is the vertically oriented plane that passes through Pivot axis 250. Pneumatic rotation system 300 contains Air supply tube 313, Air supply reinforcing bracket 316, Buoyancy vessel 330, Buoyancy cavity 350, Air pump 370, and Power source 376. Buoyancy cavity end 353 represents the point within Buoyancy cavity 350 furthest from Pivot axis 250. Air supply tube 313 along with tubing internal to Stabilized rotation device 50 (not shown) creates a pneumatic connection between Buoyancy cavity 350 and Air pump 370 such that air from Air pump 370 may run through Air supply tube 313 to fill Buoyancy cavity 350 when Air pump 370 is running. Air pump 370 and Power source 376 may be positioned as needed within Duck decoy body 100 to establish the balance described herein. Stabilized rotation device 50 has a Normal center of gravity 410 which lies along a vertical Normal center of gravity axis 413 and a Normal center of buoyancy 420 which lies along Normal center of buoyancy axis 423. Both Normal center of buoyancy axis 423 and Normal center of gravity axis 413 are oriented vertically and in the normal position Normal center of buoyancy axis 423 and Normal center of gravity axis 413 are the same axis. Buoyancy cavity center 450 is the point representing the centroid or geometric center of the volume of Buoyancy cavity 350 and Buoyancy cavity axis 453 is the vertical axis running through Buoyancy cavity center 450. Buoyancy vessel 330 is open to the water at the bottom of Buoyancy vessel 330 and has a Buoyancy vessel lower rim 333. When Stabilized rotation device 50 is in the normal position, the Cavity lower limit plane 460 is the plane passing through the highest extent of Buoyancy vessel lower rim 333. Rising end cavity surface 463 is the interior surface of Buoyancy vessel 330 closest to Rising end 106. Rising end cavity surface 463 departs from Cavity lower limit plane 460 by Cavity lower departure angle 468 and departs from vertical by Cavity vertical departure angle 473. Pivot departure distance 486 is the distance between Normal center of gravity axis 413 and Pivot plane 253. Pivot plane to buoyancy cavity axis separation 488 is the distance between Pivot plane 253 and Buoyancy cavity axis 453. Rising end plane 428 is a plane passing through the tip of Rising end 106 parallel to Pivot plane 253. Rising end plane 428 intersects the point of Rising end 106 furthest from Pivot axis 250. The tip of Rising end 106 may be considered the Protruding end point 427 as it is the furthest extent of Rising end 106 as measured from Pivot axis 250. Rising end to pivot plane distance 429 is the distance between Rising end plane 428 and Pivot plane 253. Buoyancy cavity center departure distance 480 is the distance between Buoyancy cavity axis 453 and Normal center of gravity axis 413. Pitch rotation arrows 490 indicate the type of rotation described herein as pitch.

Figure 2:
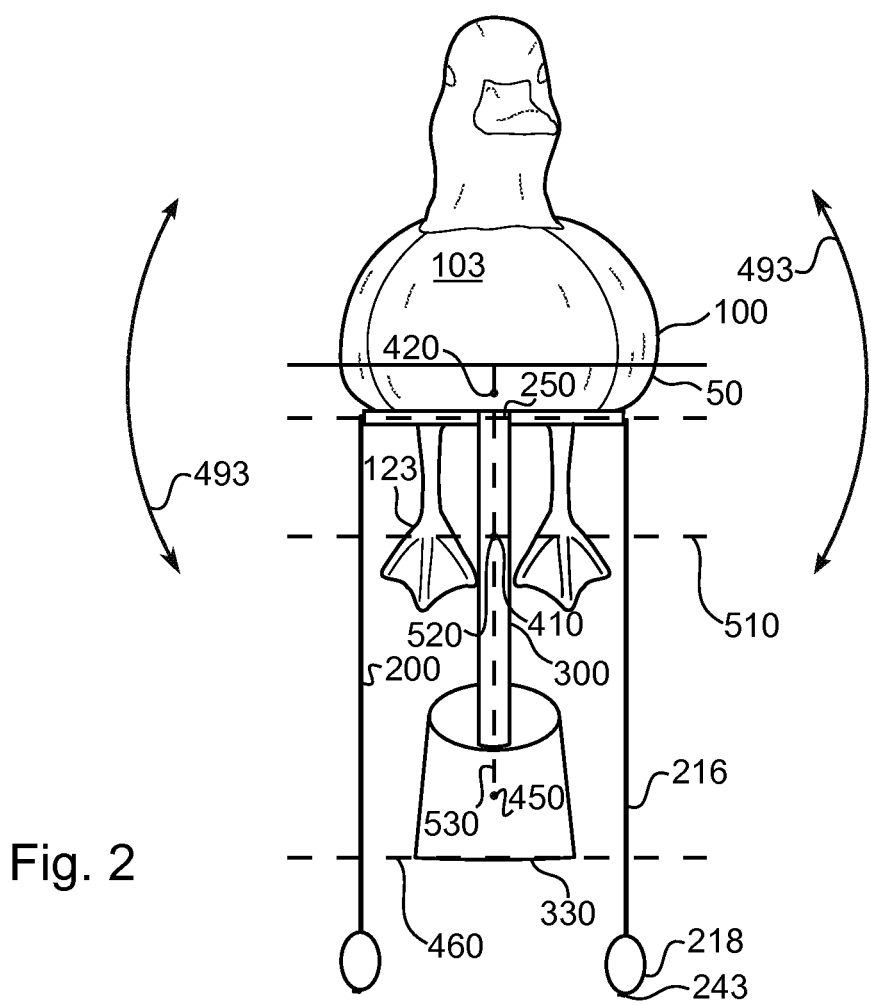
FIG. 2 shows a front view of a duck decoy embodiment in the normal position.

Referring now to FIG. 2 of the Drawings, which is a front view of the embodiment of Stabilized rotation device 50 depicted in FIG. 1 of the drawings, each of Duck decoy body 100, Stabilizing system 200, Pneumatic rotation system 300, Dipping end 103, Decoy feet and legs 123, Stabilizer wire 216, Stabilizer weights 218, Wire tips 243, Buoyancy vessel 330, Pivot axis 250, Normal center of gravity 410, Normal center of buoyancy 420, and Buoyancy cavity center 450 each appear substantially as described above. Roll rotation arrows 493 indicate the type of rotation described herein as roll.

Figure 3:
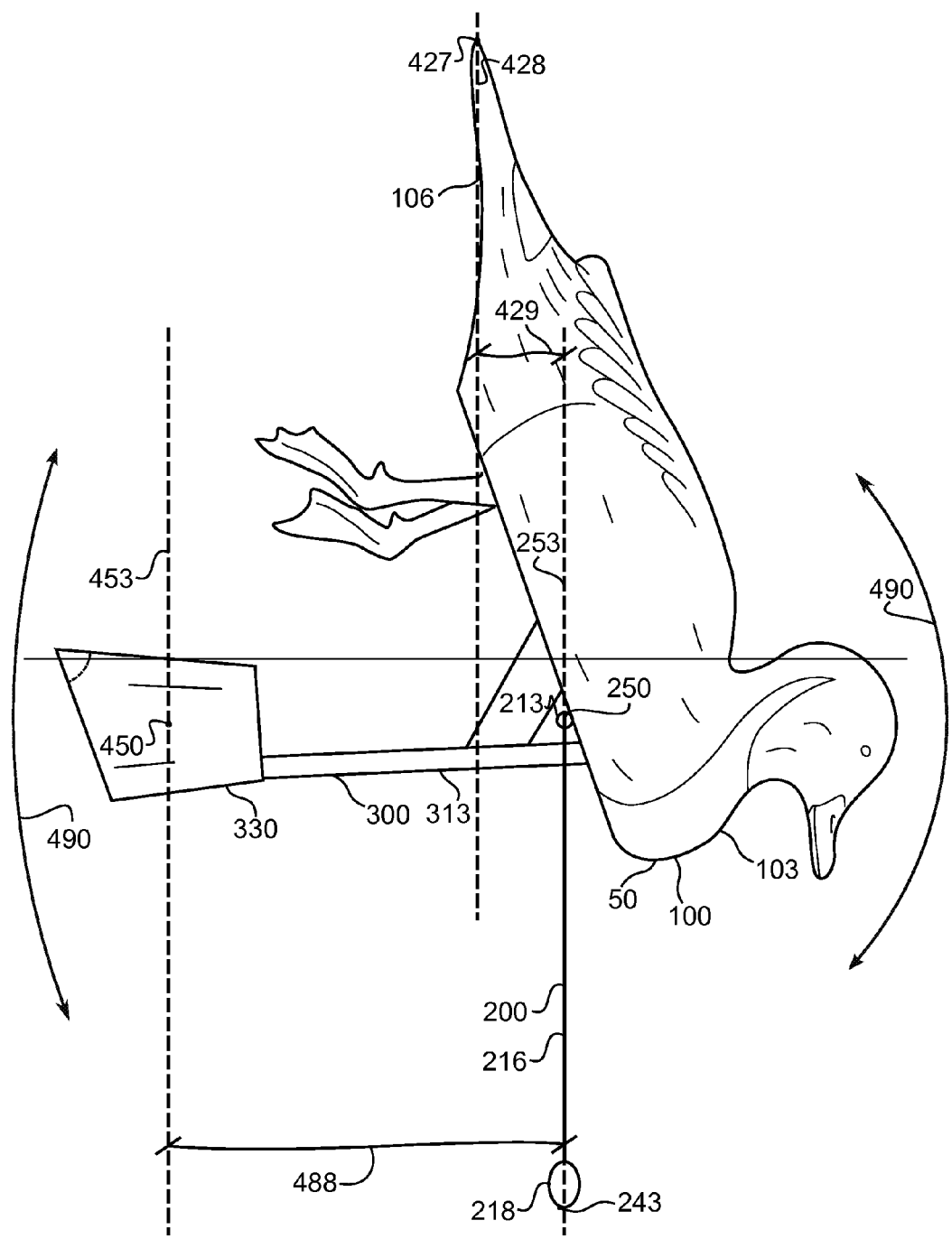
FIG. 3 shows a side view of a duck decoy embodiment in the tipped orientation.

Referring to FIG. 3 of the drawings, which is a side view of Stabilized rotation device 50, depicted in FIG. 1 of the drawings, in the tipped orientation, Duck decoy body 100, Stabilizing system 200, Pneumatic rotation system 300, Dipping end 103, Rising end 106, Stabilizer tube 213, Stabilizer wire 216, Stabilizer weights 218, Pivot axis 250, Pivot plane 253, Wire tips 243, Air supply tube 313, Buoyancy vessel 330, Protruding end point 427, Rising end plane 428, Rising end to pivot plane distance 429, Buoyancy cavity center 450, Buoyancy cavity axis 453, Pivot plane to buoyancy cavity axis separation 488, and Pitch rotation arrows 490 each appear substantially as described above, but in the tipped orientation.

Stabilized rotation device 50 is capable of moving from the tipped orientation to the normal orientation and back by the action of air continuously supplied from Air pump 370 supplied through tubing internal to Duck decoy body 100 which is connected to Air supply tube 313 which is in turn connected to Buoyancy vessel 330. This continuous supply of air acts to fill Buoyancy vessel 330 with air in the following manner. At the normal orientation Buoyancy vessel 330 is substantially water filled. Air pumped from Air pump 370 displaces the air in Buoyancy vessel 330 such that Buoyancy vessel 330 moves toward being filled with air. The action of filling Buoyancy vessel 330 with air causes a rotational force to be applied to Duck decoy body 100 and Pneumatic rotation system 300 due to the Buoyancy cavity center departure distance 480 and ultimately causes Stabilized rotation device 50 to rotate to the position shown in FIG. 3. Once Stabilized rotation device 50 reaches the position of depicted in FIG. 3, the orientation of Buoyancy vessel 330 is such that the air formerly trapped within Buoyancy vessel 330 is able to completely or nearly completely escape from Buoyancy vessel 330. The ability of Buoyancy vessel 330 to empty all of or nearly all of the air within Buoyancy vessel 330 is due in significant part to Cavity vertical departure angle 473 which is a large enough angle to provide an escape path for all of the air in Buoyancy vessel 330 when Stabilized rotation device 50 is in the tipped position. Similarly, Cavity lower departure angle 468 is small enough to provide an escape path for all of the air in Buoyancy vessel 330 when Stabilized rotation device 50 is in the tipped position. Cavity lower departure angle 468 may be approximately 60 degrees and Cavity vertical departure angle 473 may be approximately 30 degrees. After air is expelled from Buoyancy vessel 330 Stabilized rotation device 50 regains the balance and weight distribution that it had in its normal position and returns to floating at its normal position. This cycle may be repeated continuously for as long as desired or until Power source 376 is exhausted. The supply of air from Air pump 370 may be continuous. During the cycling of Stabilized rotation device 50 between the normal position and the tipped position, Stabilizer wire 216, Stabilizer weights 218, Wire tips 243 are held by gravity such that Stabilizer wires 216 are maintained in a substantially vertical orientation in spite of the motion of Duck decoy body 100 and Pneumatic rotation system 300. The continuous substantially vertical orientation of Stabilizer wires 216 prevents Duck decoy body 100 from undergoing significant roll rotation while Duck decoy body 100 is undergoing the pitch rotation caused by Air pump 370. The controlled motion of Duck decoy body 100 may be applied in any number of embodiments where the described pitch rotation with limited roll rotation is desirable and in such situations, Duck decoy body 100 may be referred to more broadly as the pitching body.

Further, the use of Stabilizing system 200 as part of Stabilized rotation device 50 allows for the decoy to move stably and relatively smoothly between the positions where Rising end 106 is elevated and where Rising end 106 is near the water with minimal rolling rotation. The rolling rotation during that motion may be less than 10 degrees or may be less than 20 degrees. In many instances, such as in duck decoys, rolling rotation may be considered undesirable because the animal being mimicked does not experience significant rolling rotation. Also, in many cases it may be desirable to have Buoyancy cavity 350 configured to surface below Rising end 106 because in the case of a decoy, the point at which Buoyancy cavity 350 surfaces may create a significant disturbance in the water with the release of air. In many cases, including the case of a duck decoy, the surfacing of Buoyancy cavity 350 below Rising end 106 creates a more natural appearance that may be associated with the natural motions of an animal such as the movement of the feet of a duck. During the operation of Stabilized rotation device 50 Pivot plane to buoyancy cavity axis separation 488 may double or more than double as Stabilized rotation device 50 moves from its normal position to the fully rotated or tipped position.

Stabilized rotation device 50 has its Normal center of gravity 410 below its Normal center of buoyancy 420 making Stabilized rotation device 50 stable. The term "stable" as used herein denotes actual floating stability as opposed to metastable floating and is directly associated with an object having center of gravity below its center of buoyancy when floating in water.

As depicted in FIG. 1, Stabilizing system 200 has a stabilizer height represented by the distance between Pivot axis 250 and the lowermost extent of Stabilizing system 200. The stabilizer height may, for example, be 10 inches. The stabilizer height may, for example, be greater than five inches. The stabilizer height may, for example, be less than fifteen inches. As depicted in FIG. 1, Stabilized rotation device 50 has a maximum buoyancy cavity departure distance represented by the distance between Pivot axis 250 and Buoyancy cavity end 353. The maximum buoyancy cavity departure distance may, for example, be 10.8 inches. As depicted in FIG. 1, Pneumatic rotation system 300 has a buoyancy center separation distance represented by the distance between Buoyancy cavity center 450 and Normal center of buoyancy 420 when Stabilized rotation device 50 is in the normal position. The buoyancy center separation distance may, for example, be 8.4 inches. As depicted in FIG. 1, Stabilized rotation device 50 has a buoyancy cavity center depth represented by the distance between Water line 130 and Buoyancy cavity center 450 when Stabilized rotation device 50 is in the normal position. The buoyancy cavity center depth may, for example, be 9.2 inches. The Rising end to pivot plane distance 429 in the normal position may, for example, be 14.2 inches. The Pivot departure distance 486 may, for example, be 1.8 inches. The Buoyancy cavity center departure distance 480 may, for example, be 1 inch.

Due to the proximity of Buoyancy cavity center 450 to Normal center of gravity axis 413 Stabilized rotation device 50 may stay in the normal position or stay nearly in the normal position for a period of time while the Buoyancy cavity 350 is filling with air. When Buoyancy cavity 350 has sufficient air to cause significant rotation of Duck decoy body 100 and Pneumatic rotation system 300, an accelerating rotational motion occurs due to the increased force caused by Buoyancy cavity center 450 becoming further removed from Normal center of gravity axis 413 and the actual center of gravity. The accelerating rotational motion may be desirable in many cases and may mimic the rotating diving motion of a duck. The center of gravity of Stabilized rotation device 50 changes positions with respect to Duck decoy body 100 during the operation of Stabilized rotation device 50 because of the relative motion of Stabilizing system 200 compared to Duck decoy body 100 and Pneumatic rotation system 300. Reference to any center of gravity herein does not include or account for mass from any water that may be in Buoyancy cavity 350. The shape of Buoyancy cavity 350 and in particular the configuration of Buoyancy vessel lower rim 333, Cavity lower departure angle 468, and Rising end cavity surface 463 allow Buoyancy cavity 350 to empty nearly completely and fill nearly completely during an operation cycle of Stabilized rotation device 50. Buoyancy cavity 350 may, for example, exhaust more than 90% of the air contained in Buoyancy cavity 350 during an operation cycle of Stabilized rotation device 50. Buoyancy cavity 350 may, for example, displace more than 85% of the water contained in Buoyancy cavity 350 with air during an operation cycle of Stabilized rotation device 50.

Alternating displacement volume 351 may, for example, be 13 cubic inches. Alternating displacement volume 351 may, for example, be less than 30 cubic inches. Alternating displacement volume 351 may, for example, be greater than 5 cubic inches. The stabilizer height may, for example, be greater than the cube root of Alternating displacement volume 351. In a significant fraction of examples, the stabilizer height may, for example, be greater than one half of the cube root of Alternating displacement volume 351. The maximum buoyancy cavity departure distance may, for example, be greater than the cube root of Alternating displacement volume 351. In a significant fraction of examples, the maximum buoyancy cavity departure distance may, for example, be greater than one half of the cube root of Alternating displacement volume 351. The buoyancy center separation distance may, for example, be greater than the cube root of Alternating displacement volume 351. In a significant fraction of examples, the buoyancy center separation distance may, for example, be greater than one half of the cube root of Alternating displacement volume 351. The buoyancy cavity center depth may, for example, be greater than the cube root of Alternating displacement volume 351. In a significant fraction of examples, the buoyancy cavity center depth may, for example, be greater than one half of the cube root of Alternating displacement volume 351. Rising end to pivot plane distance 429 in the normal position may, for example, be greater than the cube root of Alternating displacement volume 351. In a significant fraction of examples, Rising end to pivot plane distance 429 in the normal position may, for example, be greater than one half of the cube root of Alternating displacement volume 351. Buoyancy cavity center departure distance 480 may, for example, be less than the cube root of Alternating displacement volume 351. In a significant fraction of examples, Buoyancy cavity center departure distance 480 may, for example, be less than twice the cube root of Alternating displacement volume 351. Pivot departure distance 486 may, for example, be less than the cube root of Alternating displacement volume 351. In a significant fraction of examples, Pivot departure distance 486 may, for example, be less than twice the cube root of Alternating displacement volume 351.

In many embodiments, one or more of stabilizer height, maximum buoyancy cavity departure distance, buoyancy center separation distance, buoyancy cavity center depth, and Rising end to pivot plane distance 429 in the normal position is/are greater than Buoyancy cavity center departure distance 480. In a significant fraction of examples, one or more of stabilizer height, maximum buoyancy cavity departure distance, buoyancy center separation distance, buoyancy cavity center depth, and Rising end to pivot plane distance 429 in the normal position is/are greater than one half of Buoyancy cavity center departure distance 480. In many embodiments, one or more of stabilizer height, maximum buoyancy cavity departure distance, buoyancy center separation distance, buoyancy cavity center depth, and Rising end to pivot plane distance 429 in the normal position is/are greater than Pivot departure distance 486. In a significant fraction of examples, one or more of stabilizer height, maximum buoyancy cavity departure distance, buoyancy center separation distance, buoyancy cavity center depth, and Rising end to pivot plane distance 429 in the normal position is/are greater than one half of Pivot departure distance 486.

The action of Stabilized rotation device 50 and the position of various components of Stabilized rotation device 50 may be described with reference to the axes around which Stabilized rotation device 50 may rotate using nautical terminology. Considering the Protruding end point 427 as the as the equivalent of the stern of a ship, Stabilized rotation device 50 has a Pitch axis 510 running horizontally across Stabilized rotation device 50 such that vertical forces applied at the Protruding end point 427 would cause pitching motion, has a Roll axis 520 running horizontally along the length of Stabilized rotation device 50 and parallel to the waterline such that rotational forces applied at Protruding end point 427 would tend to cause Stabilized rotation device 50 to roll, and has a Yaw axis 530 represented by a line running vertically through the center of gravity such that side to side forces applied at Protruding end point 427 parallel to the water line would cause Stabilized rotation device 50 to yaw.

Certain components of Stabilized rotation device 50 may characterized by their relationship to the plane through the pitching body or Duck decoy body 100 which would match Water line 130 when Stabilized rotation device 50 is in the normal position. That plane may be referred to as the body plane. The body plane depth represents the distance from the body plane perpendicular to the body plane in the direction that is downward when Stabilized rotation device 50 is in the normal position. For example, Buoyancy cavity center 450 would be at a constant body plane depth regardless of the pitch experienced by Stabilized rotation device 50. As depicted in FIG. 1, the Cavity lower limit plane 460 and the Buoyancy vessel lower rim 333 may be located at the same body plane depth and both the Cavity lower limit plane 460 and the Buoyancy vessel lower rim 333 may be within 10 degrees of parallel to the Water line 130 when Stabilized rotation device 50 is in the normal position.

Duck decoy body 100 may, for example, be a standard pintail drake decoy such as manufactured by Game Winner/Carver's Edge or other appropriate floating decoy. Stabilizer wire 216 may, for example, be a bent 0.1 inch wire. Stabilizer weights 218, may, for example, be fishing weights. Air pump 370 may, for example, be a 2.75"L× 2.62"W×1.37"D air pump produced by Marine Metal Products as a live bait aerator. Plastic webbed feet may be attached to Duck decoy body 100 either with or without an intermediate spring to add to the action of the decoy when in motion.

Example 2

Figure 4:
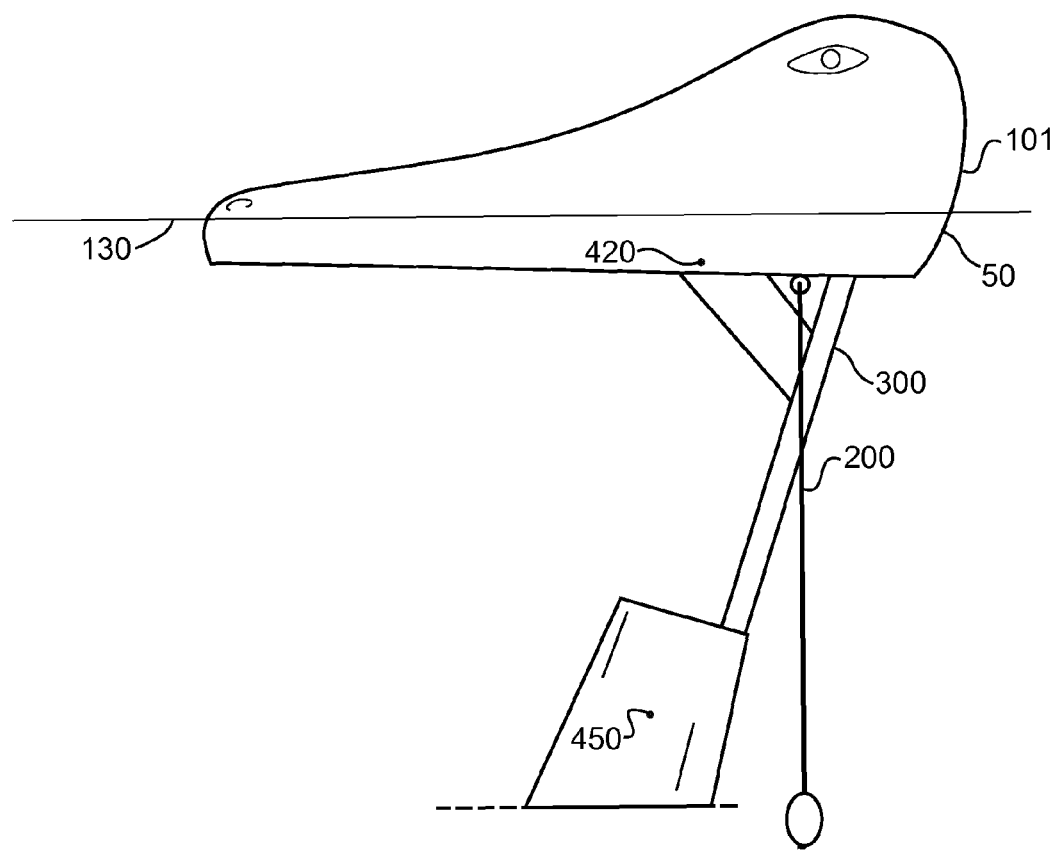
FIG. 4 shows a side view of an alligator head embodiment in the normal position.

Referring now to FIG. 4 of the drawings Stabilized rotation device 50 may have a Stabilizing system 200, Pneumatic rotation system 300, Normal center of buoyancy 420, Buoyancy cavity center 450 Water line 130, and another of other features previously recited but not called out in the drawing with Duck decoy body 100 being replaced by Animal head 101. Animal head 101 may take the form of an alligator head, a hippopotamus head or any number of other heads or other items in which the stabilized pitching effects described herein would be useful. Further Animal head 101 may be attached to a floating animal body for additional visual effect which may include a lower jaw portion that does not interfere with the operation of Stabilized rotation device 50. Operation of Stabilized rotation device 50 as depicted in FIG. 4 is substantially unchanged from the operation otherwise describe herein. The embodiment depicted in FIG. 4 may be used as pool toy or amusement device for a swimming pool or as part of some other water feature.

Example 3

In an alternate embodiment, Stabilized rotation device 50 may be configured such that Stabilizing system 200 includes a basket or guard that is situated beneath the swinging path of Buoyancy cavity 350. The basket or guard may be configured such that it would resist reeds, marsh grass, and other foreign objects from impairing the pitching motions of Stabilized rotation device 50.

Additional Embodiments

A floating device described herein may, for example, comprise a floating body, a stabilizer pivotally attached to the floating body at a pivot axis, a protruding portion of the floating body extending away from the pivot axis wherein the protruding portion is at a first height, a buoyancy cavity attached to the floating body, and an air pump and may be configured such that the stabilizer rotates freely with respect to the floating body along the pivot axis, the buoyancy cavity has a buoyancy cavity center and the buoyancy cavity center is situated at a second height, the second height is lower than the first height, the buoyancy cavity is in fluid communication with the air pump, and the buoyancy cavity has an alternating displacement volume that is sufficient to cause the floating body to rotate greater than 35 degrees with respect to the stabilizer upon application of a continuous supply of air from the air pump. In a related example, the floating body may be a duck decoy body. In a further related example, the second height may be at least five inches lower than the first height. In a further related example, the alternating displacement volume may be sufficient to cause the floating body to rotate greater than 45 degrees with respect to the stabilizer upon application of a continuous supply of air from the air pump. In a further related example, the buoyancy cavity may be configured to discharge the majority of air contained in the buoyancy cavity during a rotation cycle. In a further related example, the buoyancy cavity center may be at least five inches from the pivot axis. In a further related example, the stabilizer may have a stabilizer end and the stabilizer end may be at least five inches from the pivot axis.

A floating device described herein may, for example, comprise a floating body, a stabilizer pivotally attached to the floating body at a pivot axis, a pneumatic rotation system attached to the floating body, a buoyancy cavity within the pneumatic rotation system wherein the buoyancy cavity has a buoyancy cavity center, an alternating displacement volume situated within the buoyancy cavity; and an air pump; and may be configured such that a vertical separation of a collective center of buoyancy of the floating body, the stabilizer, and the pneumatic rotation system from the buoyancy cavity center is at least twice a horizontal separation of the collective center of buoyancy from the buoyancy cavity center when the floating body is floating in water and the alternating displacement volume is filled with water, wherein the floating body has a protruding side situated above the buoyancy cavity center and such that the protruding side and the buoyancy cavity center are located on the same side of the collective center of buoyancy. In a related example, the floating body may be a duck decoy body. In a further related example, the buoyancy cavity center is at least five inches from the collective center of buoyancy. In a further related example, the stabilizer may have a stabilizer end and the stabilizer may be at least five inches from the collective center of buoyancy. In a further related example, the buoyancy cavity may be configured to discharge the majority of air contained in the buoyancy cavity during a rotation cycle. In a further related example, the alternating displacement volume may be sufficient to cause the floating body to rotate greater than 35 degrees with respect to the stabilizer upon application of a continuous supply of air from the air pump.

A decoy described herein may, for example, comprise a duck decoy body, a stabilizer pivotally attached to the duck decoy body at a pivot axis wherein the stabilizer hangs beneath the duck decoy body, a pneumatic rotation system, a buoyancy cavity located within the pneumatic rotation system, an air pump pneumatically connected to the buoyancy cavity, a collective center of gravity of the duck decoy body, the stabilizer, and the pneumatic rotation system, and may be configured such that the buoyancy cavity is on a duck decoy body tail side of the collective center of gravity. In a related example, the collective center of gravity may be located beneath the duck decoy body. In a further related example, the buoyancy cavity may be positioned rearward of the collective center of gravity such that upon operation of the pneumatic rotation system the buoyancy cavity rotates upward along a path beneath a tail of the duck decoy body. In a further related example, the buoyancy cavity may be positioned rearward of the collective center of gravity such that upon operation of the pneumatic rotation system the buoyancy cavity discharges air on the duck decoy body tail side of the collective center of gravity. In a further related example, the stabilizer may be at least 8 inches long. In a further related example, the buoyancy cavity may be configured to discharge the majority of air contained in the buoyancy cavity during a rotation cycle. In a further related example, the stabilizer is located on a duck decoy body head side of the collective center of gravity.

The above-described embodiments have a number of independently useful individual features that have particular utility when used in combination with one another including combinations of features from embodiments described separately. There are, of course, other alternate embodiments which are obvious from the foregoing descriptions of the invention, which are intended to be included within the scope of the invention, as defined by the following claims.

I claim:
1. A floating device comprising:
 a. a floating body;
 b. a stabilizer pivotally attached to the floating body at a pivot axis;
 c. a pneumatic rotation system attached to the floating body;
 d. a buoyancy cavity within the pneumatic rotation system wherein the buoyancy cavity has a buoyancy cavity center;
 e. an alternating displacement volume situated within the buoyancy cavity; and
 f. an air pump in pneumatic communication with the buoyancy cavity;
 g. wherein a vertical separation of a collective center of buoyancy of the floating body, the stabilizer, and the pneumatic rotation system from the buoyancy cavity center is at least twice a horizontal separation of the collective center of buoyancy from the buoyancy cavity center when the floating body is floating in water and the alternating displacement volume is filled with water;

h. wherein the floating body has a protruding side situated above the buoyancy cavity center; and i. wherein the protruding side and the buoyancy cavity are located on a same side of the collective center of buoyancy.

2. The floating device of claim 1 wherein the floating body is a duck decoy body.

3. The floating device of claim 1 wherein the buoyancy cavity center is at least five inches from the collective center of buoyancy.

4. The floating device of claim 1 wherein the stabilizer has a stabilizer end and the stabilizer end is at least five inches from the collective center of buoyancy.

5. The floating device of claim 1 wherein the buoyancy cavity is configured to discharge a majority of air contained in the buoyancy cavity during a rotation cycle.

6. The floating device of claim 1 wherein the alternating displacement volume is sufficient to cause the floating body to rotate greater than 35 degrees with respect to the stabilizer upon application of a continuous supply of air from the air pump.

7. The floating device of claim 1 wherein a collective center of gravity of the floating body, the stabilizer, and the pneumatic rotation system is located beneath the floating body.

8. The decoy of claim 1 wherein the stabilizer is at least 8 inches long.

9. The floating device of claim 1 wherein the floating body is a duck decoy body and the stabilizer is located on a duck decoy head side of the collective center of gravity which is opposite the protruding side.

10. The floating device of claim 1 wherein the floating body is a duck decoy body having a duck decoy body tail, the protruding side comprising a duck decoy tail side, and wherein the buoyancy cavity is on the duck decoy tail side of a collective center of gravity of the duck decoy body, the stabilizer, and the pneumatic rotation system.

11. The floating device of claim 1 wherein the alternating displacement volume is sufficient to cause the floating body to rotate greater than 45 degrees with respect to the stabilizer upon application of a continuous supply of air from the air pump.

12. The floating device of claim 1 wherein the buoyancy cavity center is at least five inches from the pivot axis.

13. The floating device of claim 1 wherein the stabilizer has a stabilizer end and the stabilizer end is at least five inches from the pivot axis.

* * * * *